No. 686,923. Patented Nov. 19, 1901.
M. CAMPBELL.
FRICTION CLUTCH.
(Application filed July 1, 1901.)
(No Model.) 2 Sheets—Sheet 2.
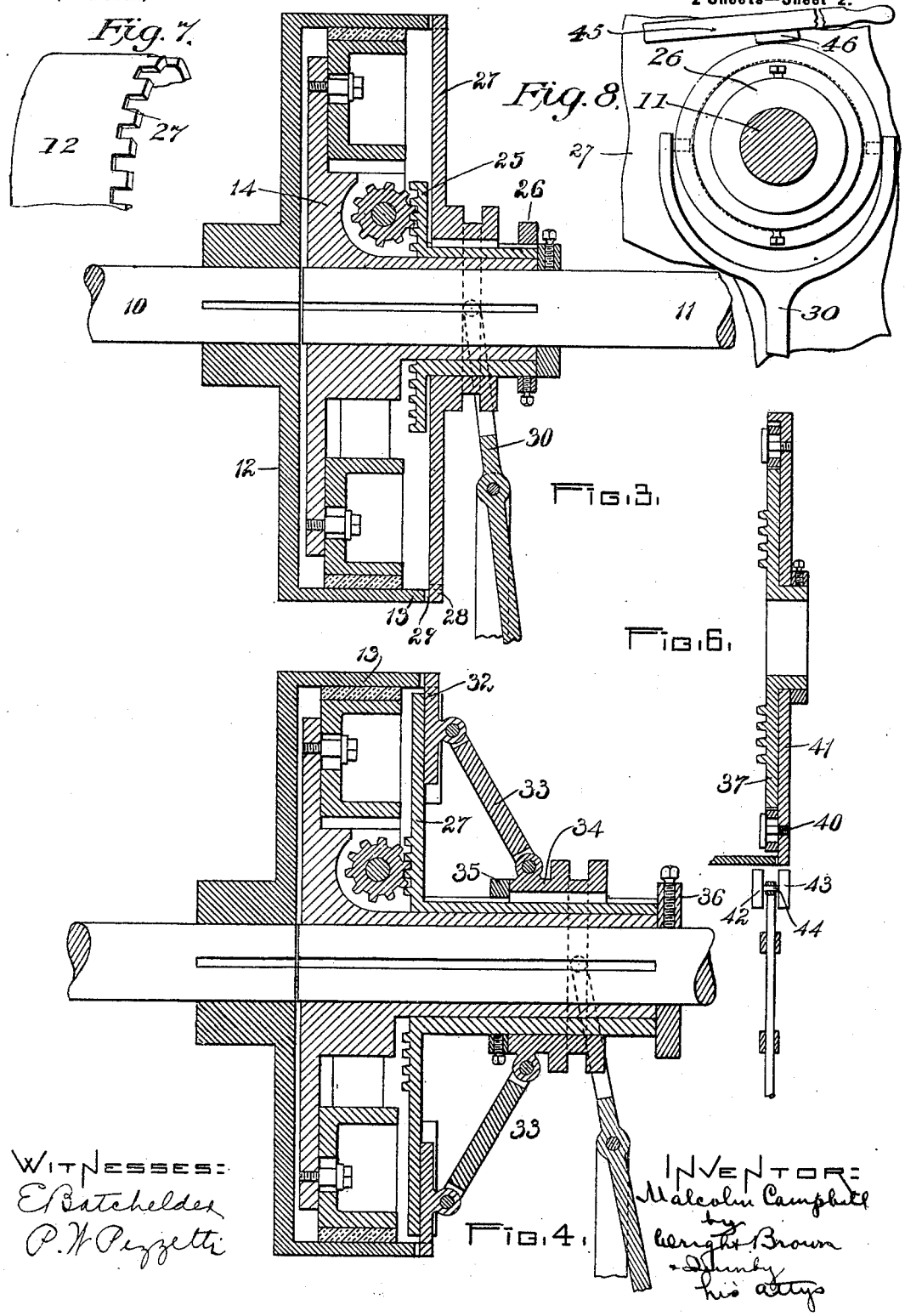

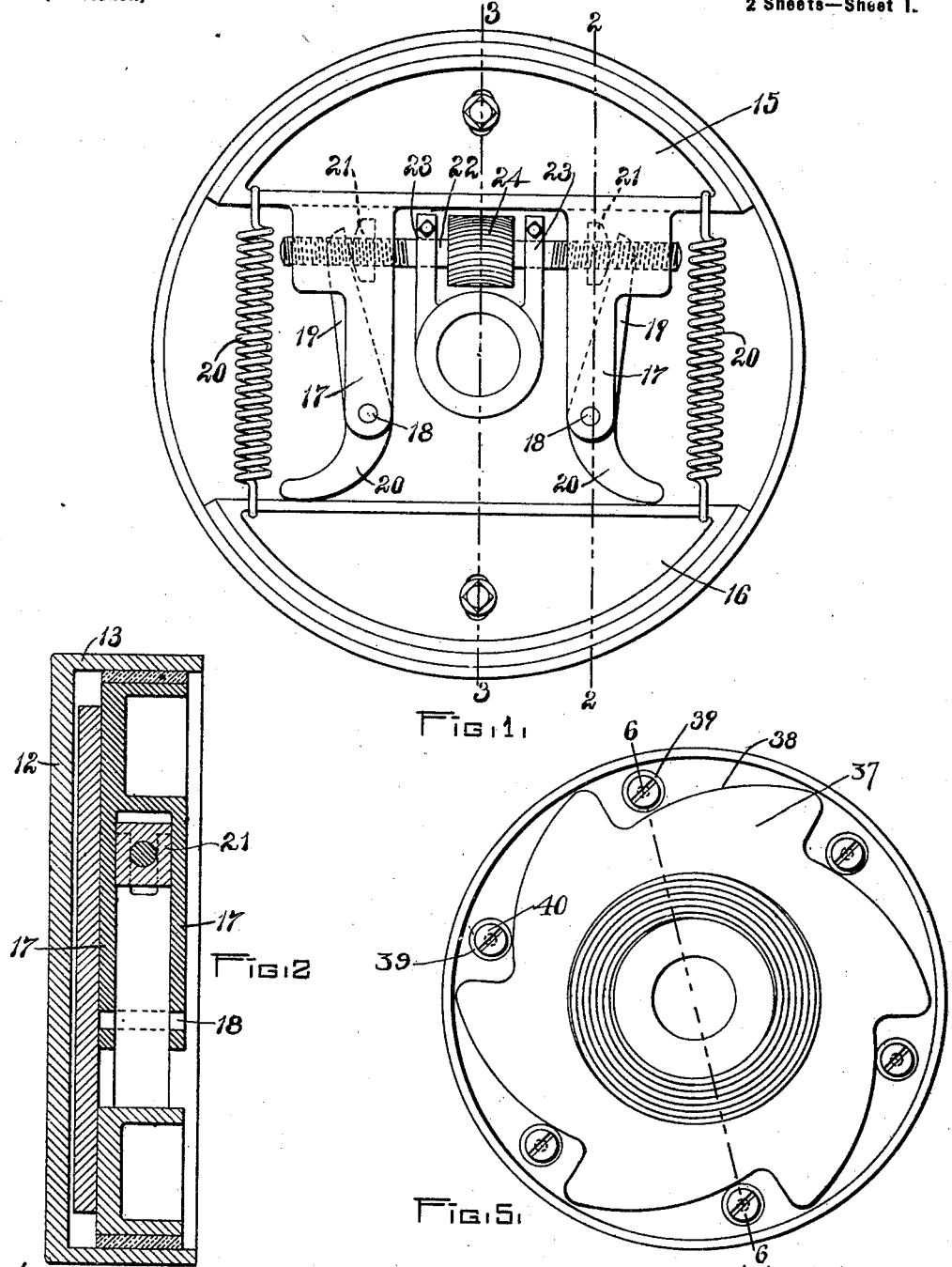

UNITED STATES PATENT OFFICE.

MALCOLM CAMPBELL, OF BOSTON, MASSACHUSETTS.

FRICTION-CLUTCH.

SPECIFICATION forming part of Letters Patent No. 686,923, dated November 19, 1901.

Application filed July 1, 1901. Serial No. 66,694. (No model.)

*To all whom it may concern:*

Be it known that I, MALCOLM CAMPBELL, of Boston, in the county of Suffolk and State of Massachusetts, have invented certain new and useful Improvements in Friction-Clutches, of which the following is a specification.

This invention has relation to friction-clutches of the type wherein one of the clutching members is provided with two oppositely-movable shoes to engage a friction-surface on the other member, a worm and worm-wheel being employed for transmitting movement to said shoes to force them into operative position. Hitherto in such mechanisms the worm has been mounted upon an independent member and provision has been made for yieldingly connecting the independent member with the moving clutch member.

According to the present invention it has been my purpose to simplify the parts of the clutch to reduce the friction hitherto necessary in order to operate the friction-shoes and also to provide means for positively locking the independent member to the moving clutch member, whereby the action of the worm will be positive.

In what the invention consists and the manner of constructing and using it are fully set forth in the following specification, reference being had to the accompanying drawings, which illustrate one embodiment of my invention and in which similar reference-numerals indicate like parts or features, as the case may be, wherever they occur.

On said drawings, Figure 1 represents in front elevation my clutch mechanism with the plate and the worm removed. Fig. 2 represents a section on line 2 2 of Fig. 1. Fig. 3 represents a section on line 3 3 of Fig. 1. Fig. 4 represents a somewhat-different embodiment of the invention. Figs. 5 and 6 show still another embodiment of the invention. Fig. 7 represents a fragment of the notched clutch member. Fig. 8 shows the application of the friction-lever to the worm-carrying member.

On the drawings the driving-shaft and the driven shaft are placed in axial alinement, as indicated in Figs. 3 and 4. To the shaft 10 is rigidly secured the rotating clutch member, which is shown as a wheel 12 with a flanged rim 13. Within the rim is placed the clutch nrember 14, keyed to the shaft 11. This member 14 is provided with the two separable shoes 15 16, whose outer edges are adapted to make contact with the inner surface of the rim 13. The shoe 15 is provided with two forked arms 17 17, having at their ends studs 18, on which are fulcrumed two levers 19 19. The free ends 20 of said levers are cam-shaped, and they are oppositely arranged, so that when the upper ends of said levers are separated or forced outwardly the cam portions bear against the shoe 16, and it is separated or forced away from the shoe 15. Both of said shoes are free to move so that they both contact with the moving member 12. Two springs 20 20 connect the shoes so as to draw them together after they are forced apart. The upper ends of the levers 19 are caused by the springs 20 to bear against the nuts 21 21, placed between the forks of the arms 17, and thus held against rotation. These nuts are upon the oppositely-threaded ends of a screw-bar 22, mounted in bearings 23 in the hub of the clutch member 14. Fast upon this screw-bar there is a worm-wheel 24, with which is engaged a worm in the form of a spiral scroll 25 on an independent scroll-plate 26, placed on the hub of the member 14, and this scroll member forms a part of an independent member consisting of the plate 27, having its hub keyed upon the hub of the scroll-plate 26, but free to slide longitudinally thereon.

The periphery of the plate 27 is provided with a plurality of teeth or lugs 28 to engage corresponding notches 29 in the flange 13 when the plate is moved into position, as shown in Fig. 3. Normally the said member, however, when the parts are unclutched is in an inoperative position, but it may be moved to operative position by a clutch-lever 30 of usual form having lugs to extend into the peripheral notch in the hub of said plate 27.

The operation of this mechanism will be readily understood. Assuming that the independent member is connected to the scroll and is in inoperative position, the lever 30 is actuated to move the said member into operative position to cause the clutch-teeth to enter the notches of the moving clutch member. This immediately causes the rotation of the member 27 and a consequent rotation of the worm or scroll-plate 26. Inasmuch as this scroll-plate is engaged with the worm 24, the worm 24 is rotated and the nuts 21 are forced out toward the end of the screw-bar, so as to swing the ends of the levers 19 about the fulcrums 18 and force the friction-shoes away from each other into frictional engagement with the flanged rim of the moving member 12. As soon as the frictional engagement between the said shoes and the moving member is sufficient to cause them to move in unison the rotation of the screw-bar 22 will cease unless the shoes slip, in which event the scroll will impart an additional movement to the screw-bar through the worm 24 to force the shoes still more tightly against the flanged rim 13.

In Fig. 4 I provide a somewhat similar construction, the only difference being that the member 27 is not axially movable, but is provided with radially-movable locking lugs or teeth 32. These lugs or teeth are connected by inclined levers 33 with a collar 34, sliding on the hub of the member 27. The collar is limited in its movement by the collar 35 on the member 27 and the collar 26, rigidly secured to the shaft 11.

I may dispense with the locking-lugs 28 and 32 and provide for a positive wedging-lock, as shown in Figs. 5 and 6. In this event the scroll-plate 37 is formed with a plurality of curved teeth 38, which form sockets for the reception of rolls 39, placed loosely upon headed screws 40, passed into the loose member 41. This said member is loosely mounted on the hub of the scroll-plate 37, and its periphery is substantially coincident with the periphery of the rotating member 12, the roll 39 being inserted between the teeth 38 and the flanged rim 13.

By any suitable friction devices, such as the two friction-rolls 42 43, fast on a connecting-shaft 44, being brought into engagement simultaneously with the independent member and the moving member, the said independent member will be given a sufficient rotation to cause the rolls 39 to ride up on the teeth 38 and become wedged between the said teeth and the flanged rim 13, so that the said scroll-plate and the moving member will be wedged together positively. Therefore the scroll-plate will be rotated and the friction-shoes 15 16 forced apart to engage the moving member.

In order to unclutch the parts, all that is necessary is to supply friction to the member 41, (shown in Fig. 6,) the member 27 in Fig. 4, (after disengaging the locking-lugs 32,) and the member 27 in Fig. 3, (after moving said member to inoperative position.) Any suitable means may be used for doing this—such as a lever 45, having a friction-shoe 46—one form of which is illustrated in Fig. 8.

Having thus explained the nature of the invention and described a way of constructing and using the same, although without attempting to set forth all of the forms in which it may be made or all of the modes of its use, I declare that what I claim is—

1. In a friction-clutch, a worm on a revoluble plate, suitable means for turning the plate, a worm-gear in operative relation to said worm, a screw-bar fast in said worm-gear, oppositely-arranged friction-shoes, and lever mechanism interposed between said shoes to move them to operative position and operated by the screw-rod.

2. In a friction-clutch, a rotatable member having a flanged rim, a second member carrying friction-shoes, lever mechanism interposed between said shoes for separating them to engage said flanged rim, a screw-bar for actuating said levers, a worm-gear on said screw-bar, and an independent member having a worm engaging said worm-wheel to rotate it and effect the operation of the shoes.

3. In a friction-clutch, two clutch members, the normally-rotating one of which is provided with a friction-surface, and the other with friction-shoes to engage said surface, cam-levers carried by one shoe and adapted to engage the other shoe for operating them, a bar oppositely threaded at its ends to actuate said levers, a worm-wheel on said bar, and means for rotating said worm, said rotating means being actuated from the moving clutch member.

4. In a friction-clutch, a normally-rotating clutch member having a friction-surface, a member having relatively-movable friction-shoes to engage the friction-surface, means for actuating said shoes including a worm rotatable independently of the shoe-carrying member, a worm-wheel, and means for positively locking the worm to and unlocking it from the said normally-rotating clutch member.

5. A friction-clutch comprising a driving member with a flanged rim, a driven member having shoes for engaging the rim of the driving member, and means for actuating said shoes including a worm and worm-wheel, an independent member carrying the worm, and means for positively locking the independent member with the driving member, said locking means comprising inclined surfaces on the independent member and rolls adapted to be wedged between said inclined surfaces and the flanged rim on the driving member.

In testimony whereof I have affixed my signature in presence of two witnesses.

MALCOLM CAMPBELL.

Witnesses:
M. B. MAY,
C. C. STECHER.